J. H. Green,
Stump Elevator.
Nº 53,294.        Patented Mar. 20, 1866.
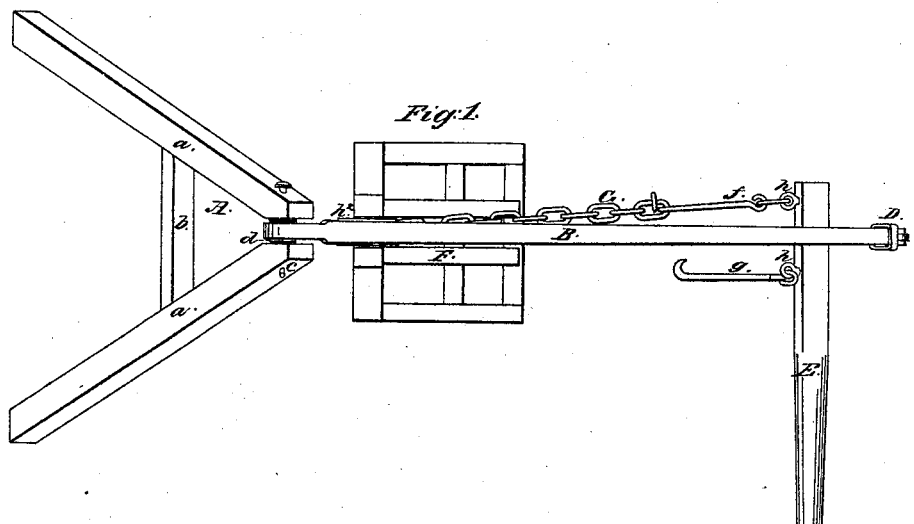
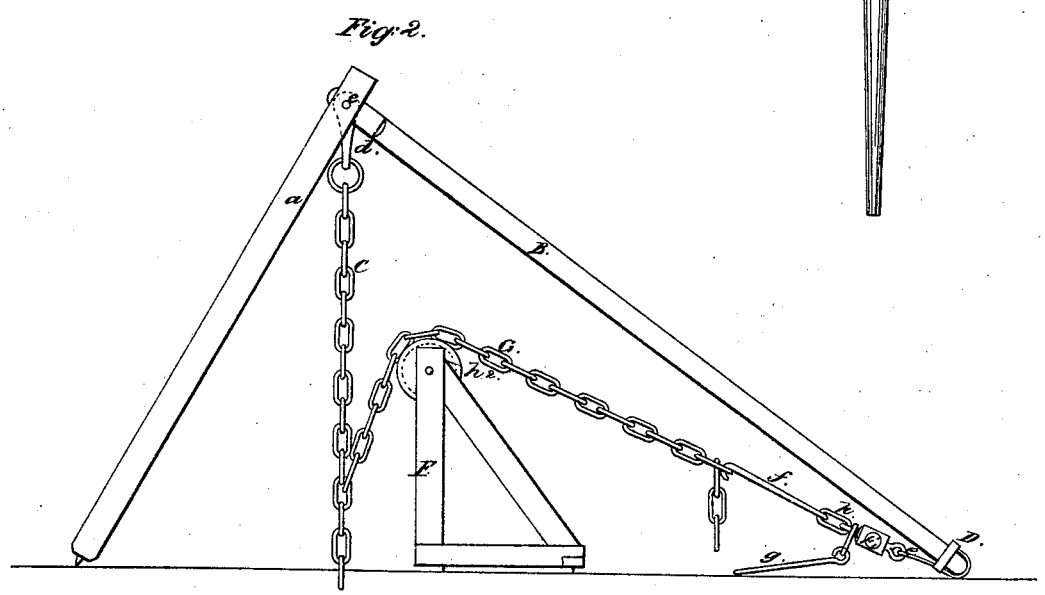
Witnesses:
G. H. Washburn.
Samuel N. Piper.
Inventor:
Jacob H Green
by his attorney
R. H. Eddy.

UNITED STATES PATENT OFFICE.

JACOB H. GREEN, OF NORTH WATERFORD, MAINE.

IMPROVEMENT IN STUMP OR STONE EXTRACTORS.

Specification forming part of Letters Patent No. 53,294, dated March 20, 1866.

*To all whom it may concern:*

Be it known that I, JACOB H. GREEN, of North Waterford, in the county of Oxford and State of Maine, have invented a new and useful Stump or Stone Extractor; and I do hereby declare the same to be fully described in the following specification and represented in the accompanying drawings, of which—

Figure 1 is a top view, and Fig. 2 a side elevation, of it.

In the said drawings, A denotes what are usually termed "shears," which consists of two posts or timbers, $a\ a$, arranged at an acute angle with one another and connected by one or more cross-ties, $b$. The upper end of a "shore" or timber, B, extends between the upper portions of the two timbers $a\ a$ of the shears and is connected to them by a bolt or pin, $c$, which goes through the whole, the connection being like a hinge. A shackle, $d$, for supporting a chain, C, extends down from the bolt $c$. The shore B is inclined or arranged with respect to the shears in manner as represented, and at its foot is stepped into a shoe, D, extending from the fulcrum $e$ of a long lever, E, provided with two hooks, $f\ g$, hung to eyes $h\ h$, arranged at equal distances from the fulcrum.

Between the shore and the shears, and so as to rest on the ground and close to the stump or stone to be raised, is a frame, F, carrying a grooved wheel or pulley, $h^2$. A chain, G, laid in the groove of the wheel, is hooked to one of the hooks $f\ g$ and to the chain C, at some distance below the wheel, the said chain C, when the extractor is in use, being fastened at its lower end to the stump or stone to be raised or to a chain going about the same.

On imparting to the lever a reciprocating motion, and in the meantime alternately engaging the hooks with the chain G, we shall draw on such chain in a manner to advance the shore or prop so as to cause the shears to rise toward a vertical position. Thus with the power of the lever we are enabled to combine the lifting power of the shears, which on moving toward the vertical line will be caused to exert a great draft upward.

I claim—

The combination and arrangement of the shears, the shore, the lever, and the stirrup, or its equivalent, or the same and the wheel-frame, the whole being arranged and provided with hooks and chains, or their equivalents, so as to operate in manner and for the purpose substantially as described.

JACOB H. GREEN.

Witnesses:
R. H. EDDY,
F. P. HALE, Jr.